(12) United States Patent
Studnicka (10) Patent No.: US 11,250,082 B2
(45) Date of Patent: Feb. 15, 2022

(54) TEXT PROCESSING OF MESSAGE DATA FOR ITEM QUERY SUBMISSION

(71) Applicant: PAYPAL, INC., San Jose, CA (US)

(72) Inventor: Todd Studnicka, Omaha, NE (US)

(73) Assignee: PAYPAL, INC., San Jose, CA (US)

( * ) Notice: Subject to any disclaimer, the term of this patent is extended or adjusted under 35 U.S.C. 154(b) by 311 days.

(21) Appl. No.: 15/851,469

(22) Filed: Dec. 21, 2017

(65) Prior Publication Data

US 2019/0197189 A1    Jun. 27, 2019

(51) Int. Cl.
  *G06F 16/9535*    (2019.01)
  *G06F 16/9038*    (2019.01)
  *G06F 16/33*      (2019.01)

(52) U.S. Cl.
  CPC ...... *G06F 16/9535* (2019.01); *G06F 16/3334* (2019.01); *G06F 16/9038* (2019.01)

(58) Field of Classification Search
  None
  See application file for complete search history.

(56) References Cited

U.S. PATENT DOCUMENTS

| | | | | |
|---|---|---|---|---|
| 2007/0088687 | A1* | 4/2007 | Bromm | G06F 16/3334 |
| 2007/0260635 | A1* | 11/2007 | Ramer | G06Q 30/0247 |
| 2013/0110814 | A1* | 5/2013 | Mohapatra | G06F 16/954 |
| | | | | 707/710 |
| 2015/0324065 | A1* | 11/2015 | Kaul | G06N 20/00 |
| | | | | 706/12 |
| 2017/0097986 | A1* | 4/2017 | Zhu | G06F 16/9535 |
| 2017/0192401 | A1* | 7/2017 | Wexler | G06K 9/00671 |
| 2018/0004718 | A1* | 1/2018 | Pappu | G06F 16/9535 |
| 2019/0066156 | A1* | 2/2019 | McMichael | G06Q 30/0256 |

* cited by examiner

*Primary Examiner* — Dawaune A Conyers
(74) *Attorney, Agent, or Firm* — Haynes and Boone, LLP (57) ABSTRACT

There are provided systems and methods for text processing of message data for item query submission. A computing device may receive message data from a messaging application, such as a text message or email. A user may utilize an input device to select or highlight a portion of the message data as text input, and utilize an application plug-in and menu from a service provider to communicate the text input to the service provider. A service provider may determine a query on a preferred merchant platform using the input. An item may be determined using the query and a platform. The service provider may then generate user interface data for the messaging application that causes the text input to output item data for the item within the application. The computing device may navigate to the merchant platform through the item data.

20 Claims, 5 Drawing Sheets

TEXT PROCESSING OF MESSAGE DATA FOR ITEM QUERY SUBMISSION

TECHNICAL FIELD

The present application generally relates to text data recognition, parsing, and/or term identification and more specifically to receiving selected message data to identify search terms for and perform an item query.

BACKGROUND

Users may receive electronic messages from other users utilizing a communication device, which may include text and media (e.g., images and videos). Often users share interests in topics in the text, which the receiving user may wish to look up on an online platform. Merchants may provide sales to users through online marketplaces including specific merchant websites, multiple merchant sales platforms, and other types of online resources that may be accessed through a web browser or mobile application. Users may view items available for sale on this platform. However, in order to locate an item for purchase, a user may be required to enter a search query or browse for the item, and locate the specific item. Both processes are time consuming and may deter users from making purchases.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for text processing of message data for item query submission. Systems suitable for practicing methods of the present disclosure are also provided.

One or more entities, such as personal users or consumers, groups of users, merchants, businesses, or other commercial agencies, may utilize device applications and/or online resources that may be interacted with through a device to perform one or more computing processes. For example, an application may allow a user to request and receive data, view the data, interact with the data, and/or transmit the data or other data between disparate devices over a network connection. The application may correspond to a messaging application, including various types of text messaging (e.g., SMS or MMS), email, instant messaging, or other messaging services. The application may therefore be used to send and receive text and/or visual data (e.g., images or videos). The application may also correspond to other types of service providers involved in online communications, including social networking, media sharing, and/or microblogging types of services that allow users to communicate with other users/merchants, post text and/or visual data and comments, and/or provide notifications or updates to other users. These other types of service providers may include online social networking services, such as FACEBOOK®, INSTAGRAM®, IMGUR®, TWITTER®, SNAPCHAT®, or other type of media sharing, microblogging, or social networking service. The application may correspond to a browser application or dedicated device application that may be used to access one or more of the above described platforms, where the application may be used to receive, browse, view, and transmit data. However, other dedicated applications of messaging platforms that utilize a service provider plug-in may also be used to provide text input processing of message data and output of application interface data from an online marketplace, as discussed herein.

In order to enable the messaging application to perform the processes described herein, a user may be required to establish an account with a service provider, and may further be required to enable or turn on a service provider search option for the application that allows text data processing of message data to determine item data on an online marketplace. This may include activating an application option and/or installing an application plug-in that adds the functionality to the application and enables the processes described herein. The account with the service provider or other online transaction processor may also be required to engage in electronic transaction processing with an online merchant or marketplace after receiving item output data in the messaging application. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide payment. In order to create an account, the user may be required to select an account name and/or provide authentication credentials, such as a password, personal identification number (PIN), answers to security questions, and/or other authentication information.

Once an account is created, the account may be accessed through a web browser from a website of the service provider and/or a dedicated application of the service provider, such as a mobile smart phone application. A token may be issued to the device of the user for their respective account, where the token may include data (which may be encrypted) allowing the service provider to identify the user and their account and authenticate the user. Thus, the token may be transmitted to other entities during transaction processing, which may allow the service provider to identify and authenticate the user's account and engage in transaction processing. The token or other identification information (e.g., a device identifier) may also be transmitted to the service provider with text input from a message in the messaging application, which may be used to generate a query and determine item information, as discussed herein. Additionally, the online service provider may provide digital wallet services, which may offer financial services to send, store, and receive money, process financial instruments, and/or provide transaction histories. The application or website may be associated with the service provider, such as PayPal® or other online payment provider service, which may provide payments and the other aforementioned transaction processing services on behalf of users, merchants, and other entities.

Once the account is active, the account may be used for electronic transaction processing services. These computing processes may electronically process transactions with online merchants and marketplaces for one or more items available with the online merchant platform. The service provider's processes may further provide additional types of benefits, features, and/or processes to users, such as fraud protection and incentives. The service provider may also provide one or more processes for in-application item look-up and data output through text selection of message data in a messaging application, as discussed herein. Thus, when utilizing the messaging application on the computing device of the user, the service provider may provide an in-application process and option to provide item data determination through text selection. In order to activate such data processing, the user may be required to establish a preference or setting with the service provider, through the account of the user, to allow or activate in-application item searches and item data output through text selection. This option may be established with the account of the user, and may be activated across all devices for the user. The option may also be enabled only for specific devices of the user, which may be selected by the user when activating the option. The service provider may receive identifiers for the user's devices when the devices use the account for transaction processing services, which may allow the user to select each individual device, or the user may enter a device identifier or otherwise link a device when selecting which devices the option may be activated on for the applications executing on those selected devices.

The messaging applications of the user's selected devices that are activated for the option to perform in-application item searches and item data output through text selection may include a process of the service provider to perform specific actions, for example, as an option and process within the application that may be provided when the application is downloaded and installed. In this regard, an owner, administrator, or provider of an application providing the in-application processes described herein may implement source code into their application for the process, where the source code may be provided by the service provider in certain embodiments. For example, the source code may be provided through a software development kit, accessible code snippet or package, or an open source platform that allows the developer to configure their application with the process. In other embodiments, the service provider may provide application plug-ins that may install and implement the in-application process in the messaging applications of the user's device that the user wishes to have access to the in-application process. The user may be required to download the plug-in from the service provider or another online platform, and install the plug-in, which may provide the process in one or more messaging applications associated with the plug-in and allow for execution of the process within the application. This may include a web browser application that may access one or more online messaging platforms. The process may also be provided by a toolbar application or application that may be executed and interface through one or more other applications to perform the processes provided herein. The process may then communicate with the service provider through the communication device based on in-application input to the messaging application.

The user may then receive message data within the messaging application or platform. The message data may include text data, such as words, letters, and other strings of characters that may make up a message or conversation through the electronic messaging platform between the user for the computing device and another user transmitting the message. The message data may have text data within the message that a user would like to find more information on. This typically requires the receiving user to copy the text and provide the text as an input to another application, such as a search field of a browser application, which results in multiple inputs and is a large source of friction in performing searches and identifying items. For example, a user informing another user of a restaurant or favorite dish at the restaurant may be of interest to the other user, but the other user may forego looking up the restaurant or food item due to the number of inputs required to search and locate the restaurant or dish.

In order to perform query submission as described herein, the user may select text data of interest to the user in performing an item query and viewing item data, for example, by highlighting the text data of interest. The user may make the selection in multiple ways, for example through touch screen input, cursor movement and input, voice input selecting the terms, or other input that selected the text data of interest to the user. Using the service provider's in-application process, the user may then request that the service provider perform an item search using the text data as input for a query, and output item data within the messaging application. The request may be selected through one or more menu options, such as a drop-down menu available during a right-click of highlighted text data, where the drop-down menu includes an option for the request. Other inputs and associated menus retrievable to locate and select the option may also be performed by the user and/or provided by the service provider's in-application process. The menu may also allow for further input, including selection of an online merchant platform to execute the search query using the text data input, as well as a number of requested results, entry of changes to the search query, or other input. The message may also or instead include image or video data, or other types of multimedia data such as animation. In such embodiments, selection of the text data by the user may correspond to selection of the media data and/or a hotspot within the media data that the user wishes to have processed using image processing to determine item data associated with the image. Thus, the text data sent to the service provider as text input for an item query may instead correspond to media input from selected media data in a message. In certain embodiments, the message may also correspond to an outgoing message from the user to another user, which may similarly include text data that is selected for a request to perform an item look-up by the service provider.

The service provider may then receive the text input selected by the user from the message data, and may process the text input to determine a search query for one or more online merchant platforms. However, in other embodiments, the device's messaging application may perform the below processes to determine a search query, search one or more online resources, receive a search result for item data, and output the item data within the application. The processes described below in reference to the service provider may also be provided through one or more processes of the user's messaging application. The text input may be processed to determine the query using one or more text processing operations and features of the service provider. The service provider and/or transaction processor may provide one or more application integration platforms and/or processes for the messaging application associated with the received text input data from the message data, which may be used to integrate data input and processing of the messaging platform to item query processes for the service provider. In this regard, the integration processes may include both applications and programmatic interfaces, such as one or more application programming interfaces (APIs), to process text data from a messaging application based on the code, processes, and protocols of the messaging platform, including data transmission protocols (e.g., online website/portal, dedicated application, messaging platform or protocol such as SMS/MMS, instant messaging, messaging through an online platform or other social networking platform).

The service provider may recognize characters, words, and/or content of the text input based on the characters of the text input. The service provider may also identify a tag or identifier in the text input. The service provider may provide natural language processing services and processes to identify the item for sale in a post by the seller. A process of the service provider may segment the selected text input from the rest of the message data and process the characters, words, and/or phrases of the selected text input. Such processing may be used to identify words, characters, and other data for a search query by the service provider. In various embodiments, the search query may correspond to an item, where item search query information may be extracted from the text/data by the service provider. Thus, the process may identify characters and keywords for a search query submission using one or more language processors. The process may correspond to an automated program that identifies the characters and/or keywords, and generates a search query using the extracted data from the text input. The process may also include one or more software processes to perform spell checking of extracted keywords and search query submission terms. The language processing process may include machine learning based on past correct and/or incorrect search query submissions and corresponding results so that keyword and/or character identification may be refined. The process may include a review process for an administrator to provide refinement of search queries where a search query or identifier keyword continues to return incorrect search results.

In order to provide text detection and/or item data recognition such that an item may be identified when submitting a search query, the service provider may allow for user designation of text for direct entry into a search query as the search terms. The service provider may utilize the direct text provided by the user as the search query in such embodiments. The service provider may also execute one or more machine learning engines and/or text recognition through a machine learning model that may be trained to reconstruct context, linguistics, and/or sentiments of words in message data, for example, where the message data may include slang, paraphrasing, and/or other characteristics of spoken or messaged data between users. The context of the selected text data, and/or the message data as a whole, may be analyzed based on training data to determine context to the selected text data, including a brand, type, quality or quantity, name, or other item data. After extracting this data, the data may be utilized as the search query.

For example, Word2vec may utilize a group of machine learning models that can reconstruct linguist context of words, for example, by analyzing words with a corresponding word vector to assist in natural language processing and determination of a proper search query. This may assist in syntax parsing to reconstruct or understand sentence structure, as well as perform sentiment analysis of selected text data and/or message data. For example, the message data may include sentiment that expresses desire for a particular type, cost, or brand for a "handbag" in general, which may only be understood through analysis of message syntax and sentiment. A language model may be implemented that assists the service provider in extracting the additional search query data, where these additional parameters may be added to the search query (e.g., the type, cost, or brand when searching "handbags"). Other types of language processing may be used to further perform search query construction.

The processing engine of the service provider's platform may also process image or video data to determine the terms for the search query where the received input from the selection may correspond to media data. The input may be processed using image processing, including object or text recognition, such as optical character recognition, to identify characters and/or terms in the media data. In this regard, the image or video processing engine may take media data selected by the user and segment the media data into identifiable characters, words, or phrases through identification of areas corresponding to potential characters, words, or phrases and performing object or text recognition to extract text data. The processing engine may then generate a search query for the extracted text data.

The service provider may then determine one or more search engines, online marketplaces, or merchant platforms to submit the search query for the text input and/or execute a search of the online resource using the text input. The platforms for searching may be done based on selected user preferences for the user with the account. For example, the user may use a preferred merchant A for item searches and item data viewing, or may wish to purchase from that merchant A. The platform may also be determined based on a transaction history for the user of past used merchants and/or based on learning preferred merchants for the user from past searches, purchases, and/or item look-up requests. The platform may also be determined based on user requests during the item look-up in-application process for particular merchants. The merchant may allow the service provider's integration platform to connect and link to the merchant's online marketplace, sales system, and/or inventory management system. For example, the merchant may provide information (e.g., web/IP address) and/or select the merchant marketplace, which may allow an API of the integration platform to integrate with the merchant marketplace and retrieve item, sales, and/or merchant information. In various embodiments, the integration platform may require the merchant to download and/or install software, such as a software plug-in, that allows the integration platform to pull information from the marketplace, sales platform, and/or inventory management system.

The service provider's process may then receive search results from the query, and may determine an item available with the merchant's platform using the search results. The search results may identify an item for sale on the merchant marketplace, and may include item data for the item. The item data may include a description, image, price, inventory, and/or other available data. The search result may also include a link to the platform, including a link to the item sale on the platform, which may correspond to a webpage link or link to data available for use on the user's device. Using the item data, the service provider may generate customized output data for an interface of the messaging application based on the retrieved item data. The output data may include a pop-up window or other display within an interface of the messaging application, such as a displayable notification including the item data. The output data may also transform or change the selected text or image portion into a selectable link that may cause the pop-up window to display when selected or hovered over with a cursor. The output data may therefore execute a process to display the item data within the application. In this regard, the output data may be particularly configured to the messaging application and interfaces of that application that was used for selection of the input for the search query. The item data may then be sent to the computing device for output.

The output data that displays the item data within the application interface may allow for navigation to the merchant's platform, and more particularly, to the item data and/or sale on the merchant platform. Selection of a link or executable process within the messaging application may cause the application or another application, such as a web browser or dedicated application of a merchant, to execute and navigate to the item sales interface for the item. The user may then view the item sales and may perform transaction processing through the interface. In various embodiments, the user may also indicate that item data and/or a selected merchant platform is incorrect, and may enter different selections of the message data or provide additional input to select further text input and/or search other platforms.

In this manner, user input required to perform a search of an online platform may be reduced and search queries may be streamlined to provide faster and more efficient results. This provides less device navigations and processing requirements, and reduces a user's overall time in submitting search queries and receiving search results. Moreover, through the use of a service provider's process implemented in a messaging application or platform, the service provider may provide in-application features and processes without requiring multiple unnecessary applications or application/interface navigations. This reduces the overall computing resources expended during processing and allows the service provider to output data within a messaging application in a concise and easy to view manner that is specifically tailored to the application's processes and computing requirements.

Figure 1:
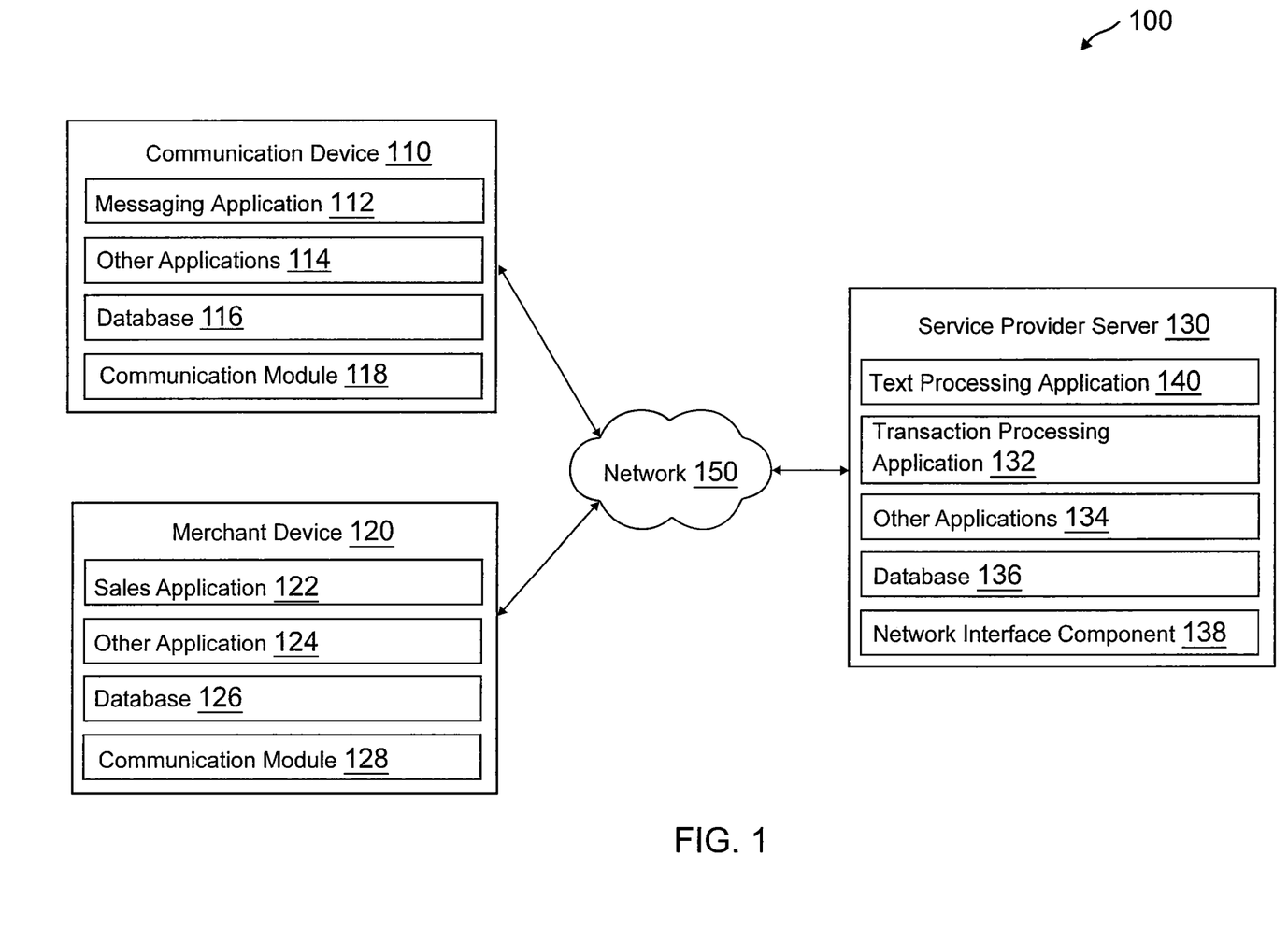
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 120, and a service provider server 130 in communication over a network 150. A user (not shown) may utilize communication device 110 to access the various features available for communication device 110, which may include processes and/or applications associated merchant device 120 and/or service provider server 130 to perform item searches using text data selection of message data in a message on communication device 110. The user may select the text data in the message, and communication device 110 may transmit the text data to service provider server 130 for processing. Service provider server 130 may process the text data and determine text input for a search query. Service provider server 130 may execute the search query using the text input with merchant device 120 to determine item data for an item available on an online platform provided by merchant device 120. Service provider server 130 may determine output data for communication device 110's messaging application, and output the data through communication device 110.

Communication device 110, merchant device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant device 120 and/or service provider server 130. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a messaging application 112, other applications 114, a database 116, and a communication module 118. Messaging application 112 and other applications 114 may correspond to executable processes, procedures, and/or applications with associated hardware. In other embodiments, communication device 110 may include additional or different modules having specialized hardware and/or software as required.

Messaging application 112 may correspond to one or more processes to execute software modules and associated devices of communication device 110 to send and/or receive messaging data, including messages between one or more other users or entities (e.g., automated messages), as well as provide a process to allow. In this regard, messaging application 112 may correspond to specialized hardware and/or software utilized by a user of communication device 110 to request access or executing of one or more application processes, which may utilize merchant device 120 and/or service provider server 130. In this regard, messaging application 112 may correspond to specialized hardware and/or software of communication device 110 to send and receive messages, for example, through one or more of text messaging (e.g., SMS or MMS), email, instant messaging, or other messaging service, or through online communications, including social networking, media sharing, and/or microblogging messaging. Messaging application 112 may include one or more interfaces to view messages, including message content, sender/recipient data, and/or other metadata (e.g., time, location, etc.). In various embodiments, messaging application 112 may correspond to a general browser application configured to retrieve, present, and communicate information over the Internet (e.g., utilize resources on the World Wide Web) or a private network. For example, messaging application 112 may provide a web browser, which may send and receive information over network 150, including retrieving website information (e.g., a website for service provider server 130), presenting the website information to the user, and/or communicating information to the website, including messaging information from one or more online messaging platforms. However, in other embodiments, messaging application 112 may include a dedicated application of service provider server 130 or other entity (e.g., a merchant or a messaging service), which may be configured to messaging services. The interface(s) providing by messaging application 112 may be utilized to send, receive, and view messages.

Messaging application 112 may include a process to select data within a message, including text data or visual data (e.g., through selection or generation of a hotspot within an image or video). Messaging application 112 may further include a process, which may be provided by a plug-in or another application, which allows the user to request that selected data within a message and form a basis for a search query for a matching item. The option to request the search query may be done through a menu or selectable interface element/icon that executes the process. The process may then transmit the selected data to service provider server 130. Messaging application 112 may receive output data in response to the selected data in the message, where the output data may correspond to displayable data within an interface of messaging application 112, such as within a window, pop-up, interface field, etc. The output data may also transfer or change the selected data in the message to a selectable option to display the output data. The output data may include item data displayed in messaging application 112, which may include a link to the item with an online platform provided by merchant device 120. Selection of the link in messaging application 112 may redirect messaging application 112 or another application to the item available from merchant device 120.

Although messaging application 112 is described herein as transmitting the selected text data within the message data to service provider server 130 and receiving output data from service provider server 130 for display in messaging application 112, it is understood that one or more of processes of service provider server 130, such as those provided by text processing application 140, may be performed by messaging application 112 without service provider server 130.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications 114 may include merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

In various embodiments, a transaction processing application of other applications 114 may be utilized to create an account used to provide item search information, such as selected merchant platforms, and process electronic transactions. In this regard, the transaction processing application may be used to enter one or more payment instruments or other funding sources for use with a payment account (e.g., stored and/or serviced by service provider server 130), access a digital wallet and/or account for use, and engage in transaction processing with another entity. The application may provide an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with service provider server 130 for use with an online digital wallet and/or account for the user, which may be utilized for transaction processing with another entity, such as a merchant associated with merchant device 120. In various embodiments, information for the account may also be stored in communication device 110 for use in an offline environment. The user may also set search preferences for use with messaging application 112 with the application and/or account, which may be used when performing a search query for an item based on selected text data within messaging application 112.

The transaction processing application may further be used to process an electronic transaction. The application may utilize user financial information, such as a credit card, bank account, or other financial account, as a payment instrument when providing payment information. Additionally, the application may utilize a digital wallet stored with an account with a payment provider, such as service provider server 130, as the payment instrument, for example, by accessing a digital wallet or account of a user with service provider server 130 through entry of authentication credentials and/or by providing a data token that allows for processing using the account. The application may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the account, digital wallet, and/or payment instruments to service provider server 130 and allow for transaction processing and payment using the account, digital wallet, and/or payment instruments. The application may be utilized to view the results of payment, for example, using transaction histories, dispute resolution processes, and other post-transaction process.

Communication device 110 may further include database 116 stored in a transitory and/or non-transitory memory of communication device 110, which may store various applications and data and be utilized during execution of various modules of communication device 110. Database 116 may include, for example, identifiers such as operating system registry entries, cookies associated with messaging application 112 and/or other applications 114, identifiers associated with hardware of communication device 110, or other appropriate identifiers, such as identifiers used for payment/user/device authentication or identification, which may be communicated as identifying communication device 110 to service provider server 130. Database 116 may include data generated during use of messaging application 112 and execution of one or more processes, including message data and selected text or visual data for use in determining item data associated with the selected data. Moreover, received output data for messaging application 112 may be stored in database 116.

Communication device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 120 may be implemented as a device or server that may utilize appropriate hardware and software configured for wired and/or wireless communication with communication device 110 and/or service provider server 130. For example, in one embodiment, merchant device 120 may be implemented as a personal computer (PC), telephonic device, a smart phone, laptop/tablet computer, one or more servers, an online merchant marketplace provided by a network of devices/servers, and/or a cloud computing architecture providing merchant sales. Although only one device is shown, a plurality of devices may function similarly.

Merchant device 120 of FIG. 1 contains a sales application 122, other applications 124, a database 126, and a communication module 128. Sales application 122 and other applications 124 may correspond to executable processes, procedures, and/or applications with associated hardware. In other embodiments, merchant device 120 may include additional or different modules having specialized hardware and/or software as required.

Sales application 122 may correspond to one or more processes that execute modules and associated specialized hardware of merchant device 120 to provide online sales, checkout, and payment processes for a transaction to purchase one or more items for sale from a merchant or seller corresponding to or utilizing merchant device 120, including providing data for items available from a merchant on an online marketplace or accessible through a website or dedicated application. In this regard, sales application 122 may correspond to specialized hardware and/or software of merchant device 120 to provide a convenient interface to permit a merchant to enter, view, and/or edit items and/or services for purchase by a user associated with communication device 110. Sales application 122 may be implemented as one or more applications providing an online platform that includes accessible item data for items for sale through sales application 122. In certain embodiments, sales application 122 may correspond generally to a web browser application configured to provide information available over the Internet or access a website corresponding to the merchant and/or an online marketplace utilized by the merchant to provide item data for items for sale and post data for communication device 110 and/or service provider server 130 to search and/or process to determine item data from a search query for selected text in a message. Thus, the data provided by sales application 122 may be utilized to generate output data in messaging application 112, where the output data includes item data resulting from a search of sales application 122 using the search query. In this regard, service provider server 130 may utilize and search data from online merchant application 112 to generate the output data, and may extract or link the item data in the output data provided to messaging application 112.

Messaging application 112 may also link to the item data, including an online sale of the item associated with the item data. Communication device 110 may be used to generate a transaction to purchase the item linked to by messaging application 112. Once a payment amount is determined for a transaction for items to be purchased by the user, sales application 122 may request payment from the user for transaction processing. Payment may be provided through a token for an account associated with communication device 110. The token may be communicated to merchant device 120, which may be used with the transaction and transaction information for processing. In other embodiments, other data may be provided for transaction processing, including financial information and/or authentication information necessary for use an account for transaction processing. Service provider server 130 may process the transaction with the provided token. Sales application 122 may then receive the results of the transaction processing, and complete the transaction with the respective user, for example, by providing (e.g., shipping) the items for the transaction or declining the transaction where the user is not authenticated or the transaction is not authorized (e.g., insufficient funds, rejection of the transaction based on risk analysis). A transaction history may then be generated by sales application 122.

Moreover, it is noted that sales application 122 may also perform one or more of the processes described herein with service provider server 130, for example, to provide item data for output within messaging application 112. However, in other embodiments, messaging application 112 may perform the search of sales application 122 and retrieval/output of item data available with sales application 122.

In various embodiments, merchant device 120 includes other applications 124 as may be desired in particular embodiments to provide features to merchant device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of merchant device 120, such as display devices capable of displaying information to users and other output devices, including speakers.

Merchant device 120 may further include database 126 stored in a transitory and/or non-transitory memory of merchant device 120, which may store various applications and data and be utilized during execution of various modules of merchant device 120. Thus, database 126 may include, for example, identifiers such as operating system registry entries, cookies associated with sales application 122 and/or other applications 124, identifiers associated with hardware of merchant device 120, or other appropriate identifiers, such as identifiers used for payment/user/device authentication or identification. In various embodiments, database 126 may information for items for sale, such as item data necessary to generate a transaction to purchase one or more of the items and/or add the items to a digital shopping cart for processing.

Merchant device 120 includes at least one communication module 128 adapted to communicate with communication device 110 and/or service provider server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., merchant device 120) using short range communications, such as Bluetooth Low Energy, LTE Direct, WiFi, radio frequency, infrared, Bluetooth, and near field communications.

Service provider server 130 may be maintained, for example, by an online service provider, which may provide transaction processing services on behalf of users and/or merchants including generation and/or processing of digital shopping carts. In this regard, service provider server 130 includes one or more processing applications which may be configured to interact with communication device 110, merchant device 120, and/or another device/server to facilitate transaction processing. In one example, service provider server 130 may be provided by PAYPAL®, Inc. of San Jose, Calif., USA. However, in other embodiments, service provider server 130 may be maintained by or include another type of service provider, which may provide connection services to a plurality of users.

Service provider server 130 of FIG. 1 includes a text processing application 140, a transaction processing application 132, other applications 134, a database 136, and a network interface component 138. Text processing application 140, transaction processing application 132, and other applications 134 may correspond to executable processes, procedures, and/or applications with associated hardware. In other embodiments, service provider server 130 may include additional or different modules having specialized hardware and/or software as required.

Text processing application 140 may correspond to one or more processes to execute software modules and associated specialized hardware of service provider server 130 to analyze receive text data selected in a message, analyze the text data to determine a search query, and execute the search query with merchant device 120 to receive search results for an item corresponding to the text data. In this regard, text processing application 140 may correspond to specialized hardware and/or software to receive a selection of text data within message data, which may correspond to text or a selection of visual data having text. Text processing application 140 may process the received data to determine a search query through one or more data processing operations using the selected text data. For example, text processing application 140 may utilize character, word, and/or phrase identification processes and language processing to determine characters, terms, or other data for the search query. Text processing application 140 may also directly use the selected text as the search query. Where the selected data corresponds to visual data, text processing application 140 may perform object or text recognition, such as optical character recognition, to determine characters and words in the selected data, and use the data to generate a search query.

Text processing application 140 may then determine one or more online platforms to search using the search query. Text processing application 140 may determine the platform through user preferences and settings established by the user associated with communication device 110, for example, with an account of the user. Text processing application 140 may also determine the platform using past platform usage and/or transactions processed by the user/account. Text processing application 140 may determine merchant device 120 is the searchable platform based on the aforementioned data. In various embodiments, the search query may be determined or refined based on the search engine, such as a natural language search engine versus an SQL based database search engine. Text processing application 140 may then submit the search query to a search engine of merchant device 120, or may execute a search using a search process of text processing 140 with the search query.

Text processing application 140 may receive search results in response to executing the search using the search query. The search results may include data for an item for sale from the merchant associated with merchant device 120, for example, an item listing for sale on a merchant platform provided by merchant device 120. The search results may include item data used to determine output data for messaging application 112. Text processing application 140 extract item data from the search results, or may otherwise utilize item data provided by the search result. Text processing application 140 may generate the output data using the item data and one or more processes, protocols, or interfaces of messaging application 112 to format the output data for messaging application 112. The output data may therefore be displayed in messaging application 112, and may include an interface element, pop-up window, data in an interface field, and/or selectable option within the interface to display the item data. The output data may also convert the selected text input into a link or selectable option to display the item data. The output data may further include a link to the item data on the platform provided by merchant device 120.

Although text processing application 140 is described herein as processing the selected text data within the message data and communicating output data to messaging application 112 for display, it is understood that one or more of processes of text processing application 140 may be performed by messaging application 112 without service provider server 130.

Transaction processing application 132 may correspond to one or more processes to execute software modules and associated specialized hardware of service provider server 130 to provide payment and transaction processing services to merchants and users, for example though an account and/or payment instruments of the user to an account of the merchant, where the service may include services for establishing preferred merchant platforms for item searching using selected text data in a message. In this regard, transaction processing application 132 may correspond to specialized hardware and/or software to provide transaction processing and payment services through accounts, including digital wallets storing payment instruments. The services may allow for a payment through a payment instrument, including a credit/debit card, banking account, payment account with service provider server 130, and/or other funding instrument. In order to establish an account to send and receive payments, transaction processing application 132 may receive information requesting establishment of the account. The information may include user personal, business, and/or financial information. Additionally the information may include a login, account name, password, PIN, or other account creation information. The entity establishing the account may provide a name, address, social security number, or other personal or business information necessary to establish the account and/or effectuate payments through the account. Transaction processing application 132 may further allow the entity to service and maintain the payment account, for example, by adding and removing funding instruments. Transaction processing application 132 may be used to enter preferences for item searching using text data in message data of messaging application 112, such as preferred merchant platforms including merchant device 120. Transaction processing application 132 may provide a payment for a transaction for an item, such as an item resulting from a search of merchant device 120. Transaction processing application 132 may debit an account of the user and provide the payment to an account of the merchant associated with merchant device 120. Transaction processing application 132 may also be used to provide transaction histories for processed transactions.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include connection and/or communication applications, which may be utilized to communicate information to over network 150.

Additionally, service provider server 130 includes database 136. As previously discussed, the user and/or the merchant may establish one or more digital wallets and/or accounts with service provider server 130. Digital wallets and/or accounts in database 136 may include user information, such as name, address, birthdate, payment instruments/ funding sources, additional user financial information, user preferences, and/or other desired user data. Users may link to their respective digital wallets and/or payment accounts through an account, user, merchant, and/or device identifier. Thus, when an identifier is transmitted to service provider server 130, e.g., from communication device 110, one or more digital wallets and/or payment accounts belonging to the users may be found. Database 136 may also store received data of selected text for processing and searching from a message. Additionally, search results having item data resulting from a search query using the selected text, and output data for messaging application 112 that displays the item data, may be stored in database 136.

In various embodiments, service provider server 130 includes at least one network interface component 138 adapted to communicate communication device 110 and/or merchant device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
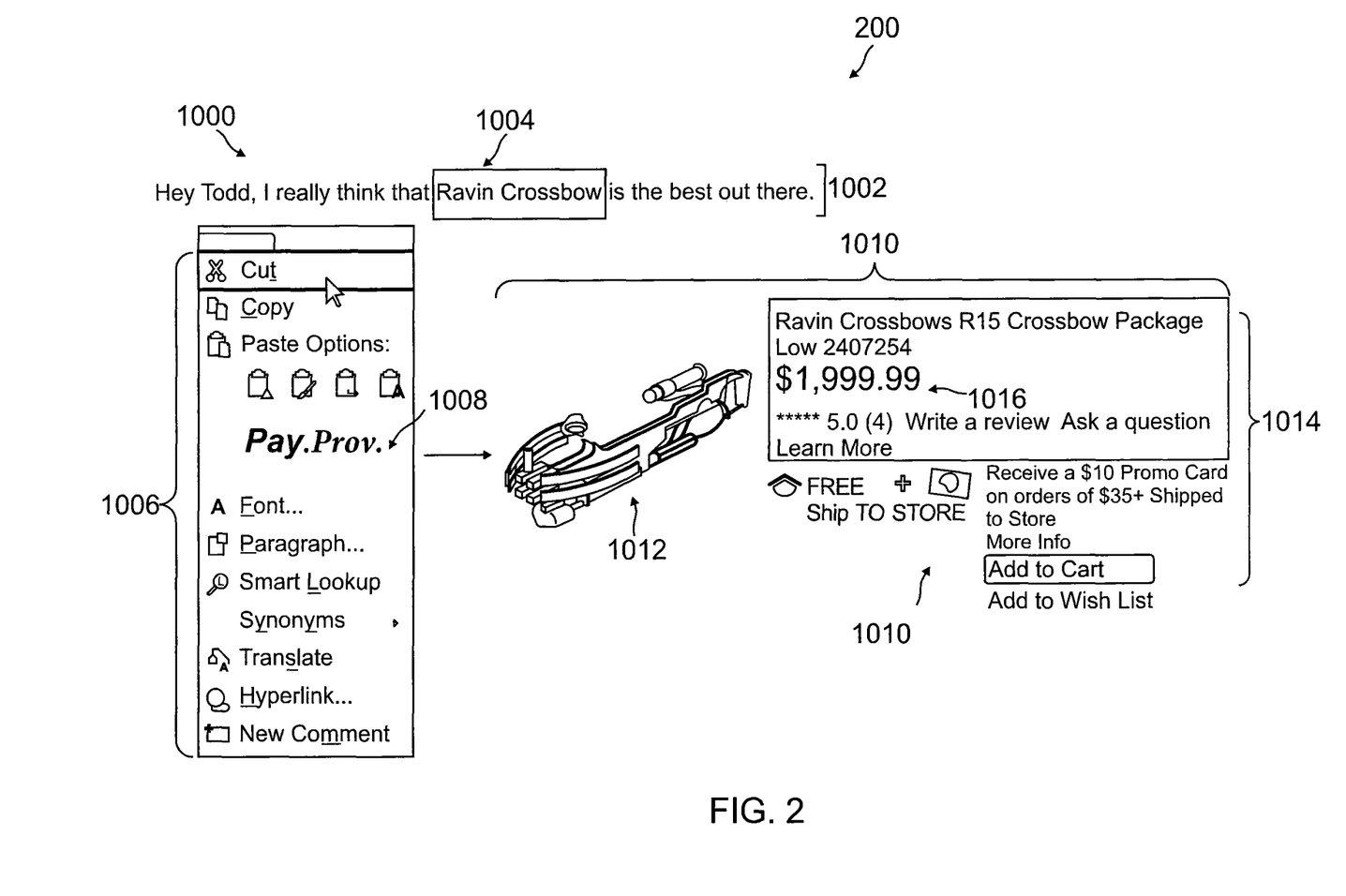
FIG. 2 is an exemplary user interface of a device processing text message data to identify search query terms and outputting a processed search query in a messaging application interface, according to an embodiment.

FIG. 2 is an exemplary user interface of a device processing text message data to identify search query terms and outputting a processed search query in a messaging application interface, according to an embodiment. Environment 200 includes an application interface 1000 output by a communication device, such as communication device 110 having the described features, processes, and components discussed in reference to system 100 of FIG. 1. In this regard, a user viewing application interface 1000 in environment 200 may view displayed data from processes executed by one or more of the applications discussed in reference to communication device 110, such as messaging application 112 in system 100.

Application interface 1000 may display data during an executing process of an application, such as application output data that may be displayed in messaging application 112 based on item data determined using selected text in a message displayed by messaging application 112. For example, application interface 1000 includes a text message 1002 having message content. The message content may include characters, words, and phrases that make up text message 1002. A user viewing application interface 1000 may select a portion of text message 1002 to learn more about a particular item and receive item data based on a search. An input component of communication device 110 may be used to highlight selected text data 1004. Selected text data 1004 is shows as "Ravin crossbow" in environment 200, and corresponds to a text portion of text message 1002 that the user would like to receive item data for.

In response to highlighting selected text data 1004 as the text input for a search for item data, the user may further use the input component of communication device 110 to open a menu 1006, for example, through a click of a mouse or input to a touch screen interface. Once opened, menu 1006 may include a menu option 1008 for a service provider, such as service provider server 130, which may correspond to an application process, extension, or plug-in that allows for item data searching using selected text data 1004. Menu option 1008 may allow for selected text data 1004 to form the basis for a search query executed by messaging application 112 and/or service provider server 130. Selected text data 1004 may then be converted into a search query using the text or other data within selected text data 1004 and/or application interface 1000.

Using selected text data 1004 as the basis for the search query, a search may be executed and search results may be processed to determine item data 1010. Item data 1010 may be displayed within application interface 1000 based on output data determined using the search results, such as data for the item on the platform. Item data 1010 may be specifically configured for application interface 1000, for example, so that it may be output in messaging application 112. Item data 1010 includes an image 1012 of the item resulting from selected text data 1004 on the preferred merchant platform, which shows an image of a crossbow matching "Ravin crossbow." Item data 1010 may also include sales data 1014 for the item found using a search query generated from selected text data 1004. Sales data 1014 may be extracted from the preferred merchant platform, and may provide data in application interface 1000 that allows the user to view a potential sale and purchase of the item. Sales data 1014 may include a price 1016 and a purchase option 1018. Purchase option 1018 may correspond to a link to the merchant platform to purchase the item. In various embodiments, purchase option 1018 may be executed within application interface 1000, for example, through messaging application 112 directly, and navigation to the platform may not be required.

Figure 3:
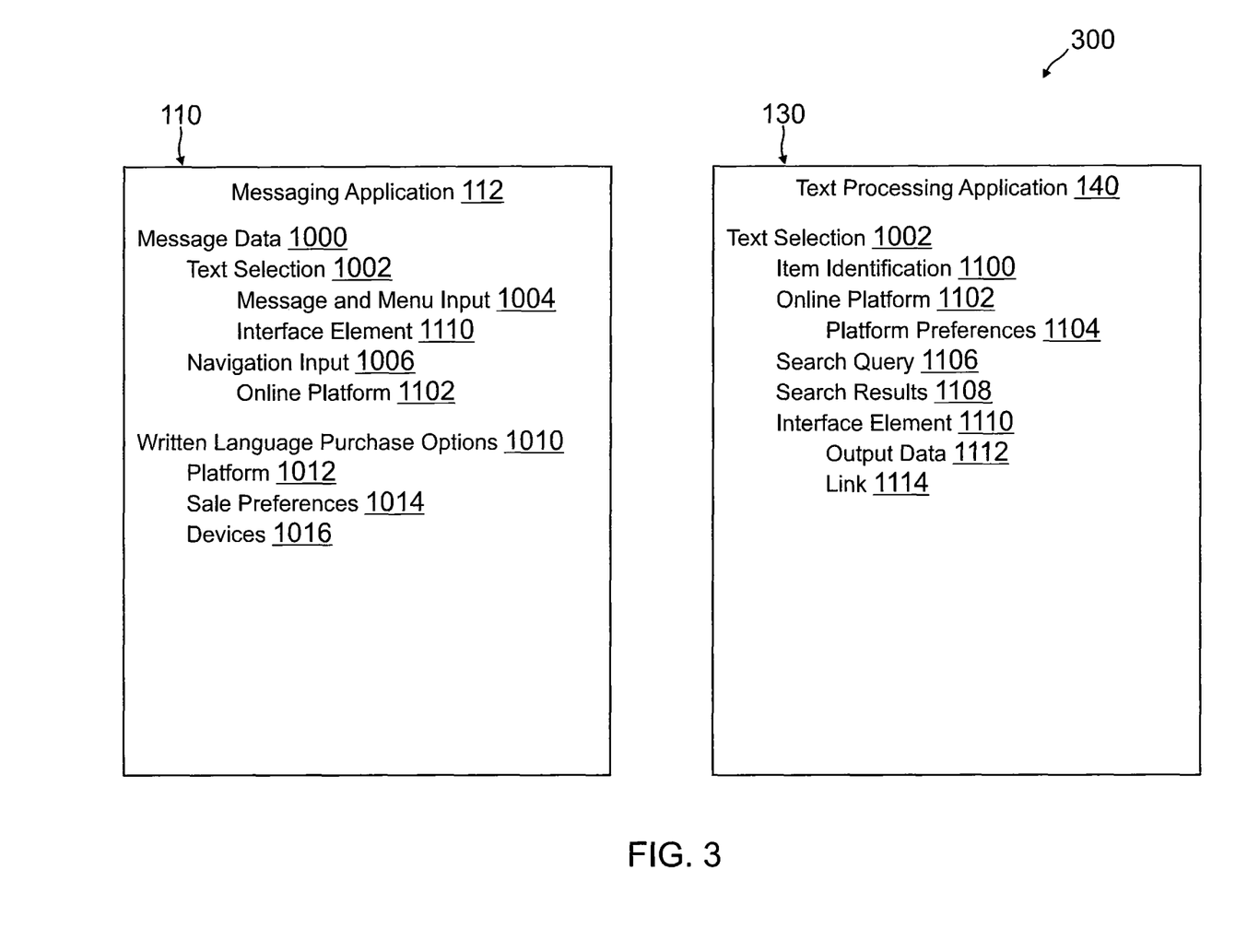
FIG. 3 is an exemplary system environment where a communication device and a service provider may interact to process text message data, perform search queries, and output specific interface data in a messaging application, according to an embodiment.

FIG. 3 is an exemplary system environment where a communication device and a service provider may interact to process text message data, perform search queries, and output specific interface data in a messaging application, according to an embodiment. FIG. 3 includes communication device 110 and service provider server 130 discussed in reference to system 100 of FIG. 1.

In environment 300, communication device 110 executes messaging application 112 corresponding generally to the processes and features discussed in reference to system 100 of FIG. 1. In this regard, communication device 110 may utilize messaging application 112 to execute one or more processes, which may include processes with message data 1000 to allow a user to select portions of message data 1000 and utilize the select information to search for and display item information. Message data 1000 may be associated with text selection 1002 based on a selection of a portion of message data 1000, where text selection may include selected text within message data 100. Moreover, text selection 1002 may include message and menu input 1004, which may correspond to additional input from message data 1000 and/or through menu options when requesting a search of text selection 1002.

In environment 300, service provider server 130 executes text processing application 140 corresponding generally to the processes and features discussed in reference to system 100 of FIG. 1. In this regard, service provider server 130 may utilize text processing application 140 to receive text selection 1002, and process text selection 1002 to determine item data that may be output in messaging application 112. Text selection 1002 may therefore be processed to determine an item identification 1100 that may be the basis for a search query. Text processing application 140 may then determine an online platform 1102 to search using the search query, which may be selected using platform preferences 1104 for the user associated with communication device 110. Based on item identification 1100 and online platform 1102, search query 1106 may be determined and may be used to search online platform 1102. Text processing application 150 may determine search results 1108 from search query 1106, which may include item information for item identification 1100 on online platform 1102.

In response to search results 1108, text processing application 140 may generate an interface element 1110 for messaging application 112, which may correspond to output data specifically generated for the output requirements of messaging application 112. Interface element 1110 includes output data 1112, such as item data associated with item identification 1100 on online platform 1102. Interface element 1110 may also include a link 1114 to the item data on online platform 1102. Text processing application 140 may communicate interface element 1110 to communication device 110 for use in messaging application 112. Text selection 1002 in messaging application 112 may then be associated with interface element 1110 that may be output with text selection 1002. Moreover, using interface element 1110, a navigation input 1006 may be entered, which may correspond to a navigation to online platform 1102. Messaging application 112 may also be used to provide preferences in written language processing for text data in messages, such as written language purchase options 1010. Written language purchase options may allow a user to set preferences for platforms 1012 to search, sale preferences 1014 for items to locate (e.g., price, brand, type, cost limitations, sale or discount preferences, etc.), and device 1016 that may enable text data searching in messages.

Figure 4:
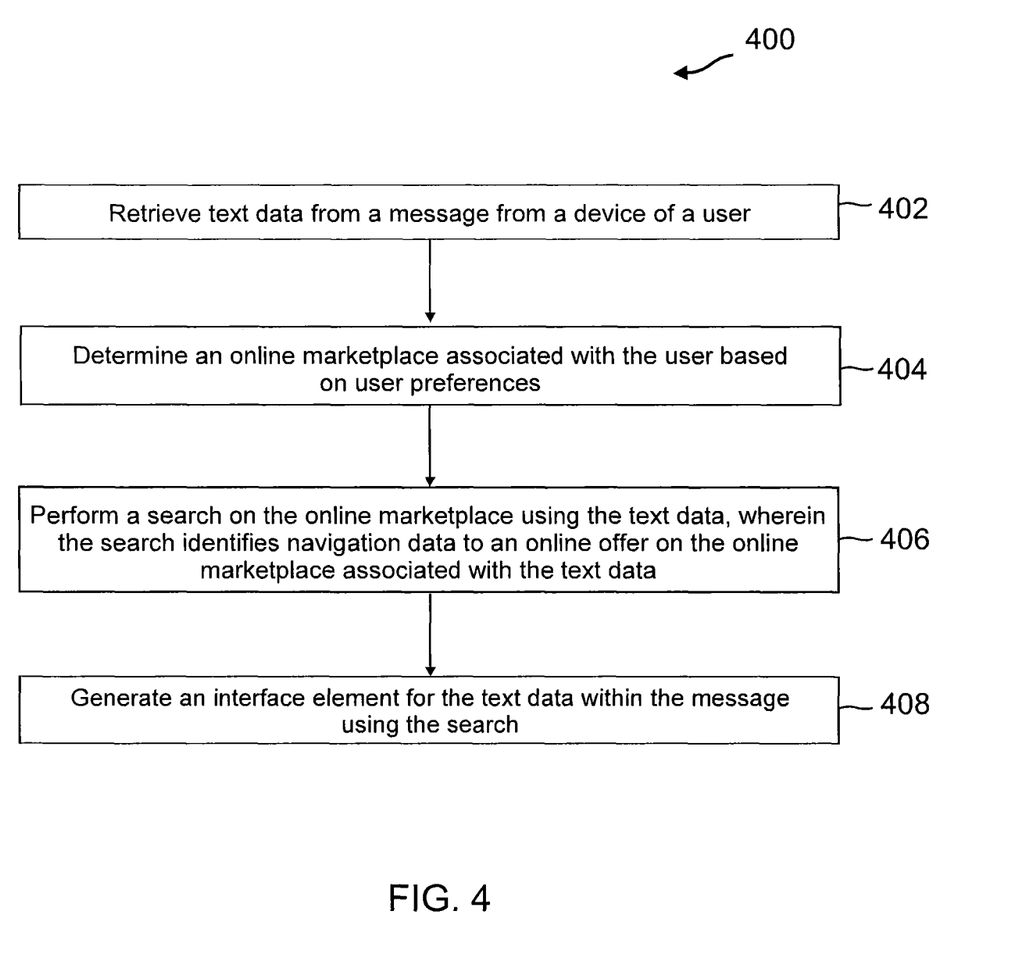
FIG. 4 is a flowchart of an exemplary process for text processing of message data for item query submission, according to an embodiment.

FIG. 4 is a flowchart 400 of an exemplary process for text processing of message data for item query submission, according to an embodiment. Note that one or more steps, processes, and methods described herein may be omitted, performed in a different sequence, or combined as desired or appropriate.

At step 402 of flowchart 400, text data from a message communicated through a device of a user is received. The text data may therefore correspond to text input requested to for a search on an online platform, and may be transmitted to the system based on highlighting the text data in message data corresponding to the message through input by the user via an interface displaying the message. An online marketplace associated with the user is determined based on user preferences, at step 404 of flowchart 400. The user preferences for the user may be based on at least one of a transaction history for the user, a browser history associated with the user, or an application installed on the device.

At step 406 of flowchart 400, a search on the online marketplace is performed using the text data, wherein the search identifies navigation data to an online offer on the online marketplace associated with the text data. The search may identify sale data for the online offer, where the interface element displays the sale data with the text data. In order to perform the search, search term may be required to be identified and/or determined using the text data. In order to determine the term, the text data may be parsed and/or processed to determine the search terms. Additionally, a second device or a second account may be determined using the message, and a browsing history for the at least one of the second device or the second account may be determined, wherein the browsing history includes an indication of interest in the first item. The search term may be further identified using the browsing history. The message data may correspond to an image or video, and the search term may be determined by executing an image analysis process with the image, wherein the search term is identified using the image analysis process and content in the image. The image analysis process may comprise optical character recognition, wherein the text input comprises selection of a hotspot in the image for optical character recognition of the hotspot. In order to determine the search term, content of the message may also be processed in addition to the text data selected by the user, wherein the search term is further determined based on the content of the message.

At step 408 of flowchart 400, an interface element is determined for the text data within the message using the search. The interface element may comprise a pop-up window displayed on the device in response to a selection of the text data. The selection of the text data may be performed using a drop down menu provided in a messaging application comprising the message, and interface output data for the messaging application stored in a database may be accessed in order to determine the interface element. The selection of the text data may also comprises highlighting the text data in the message and selecting the highlighted text data, wherein selecting the highlighted text data causes display of the drop down menu in the messaging application, and wherein the drop down menu causes the device to request the search using the text data. The pop-up window may display the online offer and provide for navigates to the online offer using the navigation data.

In various embodiments, a request for a change of at least a portion of the search and/or search results, such as the output interface element may be received, and a second search may be determined using the request. The second search for a second item may then be executed. The request for the change may comprise a request for a second platform, wherein the second search is executed with the second platform. After generating the interface element, the process of flowchart 400 may further output the interface element with the message on the device. In response to receiving a selection of the interface element, the process may further include directing an application executing on the device to the online offer using the navigation data. In various embodiments, a transaction processing request for an item identified in the search may be received and an electronic transaction with the online marketplace or other online merchant platform may be processed for the item using an account associated with the device. The account may comprise an active option to allow in-message highlighting to search for items through selecting the text data in the message, wherein the active option is activated across all devices utilizing the account.

Figure 5:
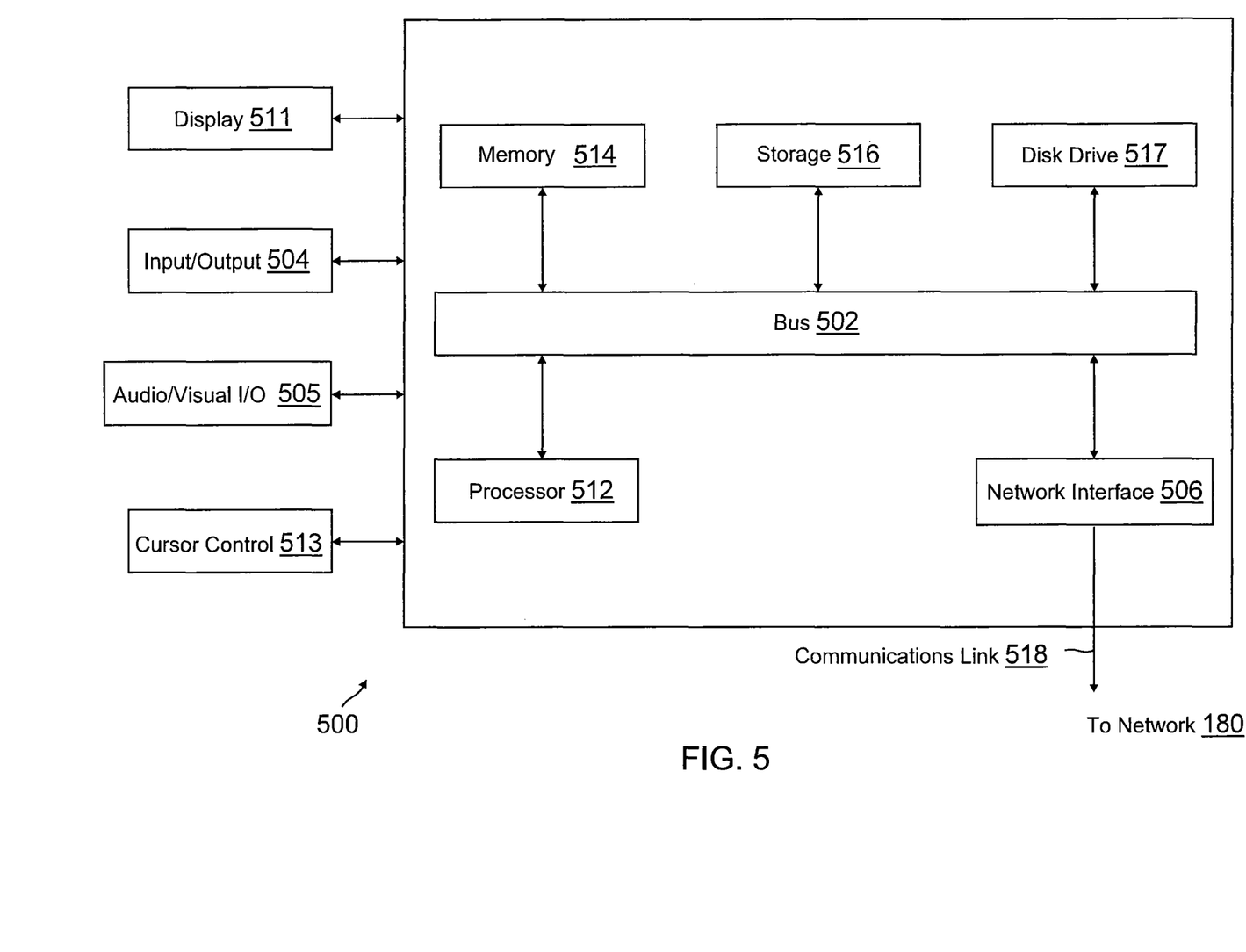
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a network interface component configured to communicate with a first device and a first online platform;
    a non-transitory memory comprising a database storing interface output data for a plurality of device applications; and
    one or more hardware processors coupled to the non-transitory memory and configured to read instructions to cause the system to perform operations comprising:
        receiving, from a plug-in provided by the system for a messaging application on the first device, text input and an image contained within message data in the messaging application, wherein the plug-in is associated with a first account utilized through the first device with the system;
        identifying a plurality of image areas corresponding to text in the image using an optical character recognition (OCR) process;
        extracting the text from the plurality of image areas of the image using the OCR process;
        identifying a search term for a first item from the text input and the extracted text;
        determining a sentiment for a search parameter for the first item from the text input using a language processing model, wherein the search parameter comprises a property associated with the first item;
        determining additional text data separate from the text input within the message data;
        analyzing the additional text data using a machine learning model trained based on contextual message data received by the system;
        determining an item type and an item quantity for the first item based on the sentiment and the analyzing;
        determining the first online platform utilized by the first account based on past data of online platform usage through the first account;
        executing a first search on the first online platform using the search term, the item type, and the item quantity, wherein the first search comprises a query having a plurality of query terms based on the search term, the item type, and the item quantity;
        in response to receiving search results comprising the first item available with the first online platform, extracting item data for the first item on the first online platform;
        generating output data for the item data with the message data using the interface output data, wherein the interface output data changes the text input in the messaging application of the first device to a selectable option to display the item data and a link to the first item on the first online platform in an interface displaying the message data;
        transmitting the output data to the first device; and
        transmitting purchase information associated with the search results to a second device for a merchant associated with one of the message data or the search results based on a selection of the selectable option.

2. The system of claim 1, wherein the text input is received by the system from the first device in response to the text input being highlighted in the message data through input to the interface displaying the message data.

3. The system of claim 2, wherein the operations further comprise:
    determining a second account using the message data; and
    determining a browsing history for the second account, wherein the browsing history includes an indication of interest in the first item,
    wherein the search term is further identified using the browsing history.

4. The system of claim 1, wherein the image comprises a selection of a plurality of hotspots in the image for the identifying using the OCR process.

5. The system of claim 1, wherein the operations further comprise:
    receiving a request to process a transaction via the selectable option; and
    processing the transaction for the first item with the first online platform.

6. The system of claim 1, wherein the operations further comprise:
    receiving a request for a change of at least a portion of the first search;
    determining a second search based on the request; and
    executing the second search for a second item.

7. The system of claim 6, wherein the request for the change comprises a request for a second online platform, and wherein the second search is executed on the second online platform.

8. The system of claim 1, wherein the first account comprises an active option to allow in-message highlighting to search for items through selecting the text input in the message data, and wherein the active option is activated across other devices utilizing the first account.

9. The system of claim 1, wherein the operations further comprise:
    parsing content of the message data in addition to the text input, wherein the search term is further determined based on the content of the message data.

10. The system of claim 1, wherein the identifying the plurality of image areas comprises segmenting the image into the plurality of image areas based on at least one identifiable character in each of the plurality of image areas.

11. A method comprising:
    receiving, from a plug-in for a messaging application on a device of a user, text data and an image from a message communicated through the device using the messaging application, wherein the text data comprises an item of interest to the user;
identifying a plurality of image areas corresponding to text in the image using an optical character recognition (OCR) process;
extracting the text from the plurality of image areas of the image using the OCR process;
determining a sentiment for a search parameter for the item from the text data using a language processing model, wherein the search parameter comprises a property associated with the item;
determining additional text data separate from the text data within the message;
analyzing the additional text data using a machine learning model trained based on contextual message data;
determining an item type and an item quantity for the item based on the sentiment, and the analyzing;
determining an online marketplace associated with the user based on a user preference;
performing a search on the online marketplace using the text data with the extracted text, the item type, and the item quantity, wherein the search identifies navigation data to an online offer for the item on the online marketplace associated with the text data, and wherein the search comprises a query having a plurality of query terms based on the text data, the item type, and the item quantity;
generating an interface element for the text data within the message using the search;
outputting the interface element with the message on the device; and
transmitting purchase information associated with the search to another device for a merchant associated with one of the message or the search based on a selection of the interface element on the device.

12. The method of claim 11, wherein the interface element comprises a pop-up window displayed on the device by the plug-in in response to a selection of the text data.

13. The method of claim 12, wherein the selection of the text data is performed using a drop down menu provided in the messaging application comprising the message using the plug-in, and wherein prior to the generating the interface element, the method further comprises:
accessing interface output data for the messaging application stored in a database.

14. The method of claim 13, wherein the selection of the text data comprises highlighting the text data in the message and selecting the highlighted text data using the plug-in, wherein selecting the highlighted text data causes a display of the drop down menu in the messaging application, and wherein the drop down menu causes the device to request the search using the text data.

15. The method of claim 12, wherein the pop-up window displays the online offer, and wherein the pop-up window navigates to the online offer using the navigation data.

16. The method of claim 11, further comprising:
in response to receiving the selection of the interface element, directing a shopping application executing on the device to the online offer using the navigation data.

17. The method of claim 11, wherein the search further identifies sale data for the online offer, and wherein the interface element displays the sale data with the text data.

18. The method of claim 11, further comprising:
determining the user preference for the user based on at least one of a transaction history for the user, a browser history associated with the user, or an application installed on the device.

19. A non-transitory machine-readable medium having stored thereon machine-readable instructions executable to cause a machine to perform operations comprising:
receiving, from a plug-in for a messaging application on a device, a selection of a portion of a message in the messaging application with an image in the message, wherein the portion of the message comprises an item of interest designated by the selection;
identifying a plurality of image areas corresponding to text in the image using an optical character recognition (OCR) process;
extracting the text from the plurality of image areas of the image using the OCR process;
determining a sentiment for a search parameter for the item from the portion of the message using a language processing model, wherein the search parameter comprises a property associated with the item;
determining additional text data separate from the portion within the message;
analyzing the additional text data using a machine learning model trained based on contextual message data;
determining an item type and an item quantity for the item based on the sentiment and the analyzing;
determining a search query based on the selection with the extracted text, the item type, and the item quantity, wherein the search query comprises a plurality of query terms based on the portion of the message, the item type, and the item quantity;
performing a search with an online merchant using the search query;
in response to receiving, based on the performing, a search result comprising the item offered for sale with the online merchant, determining display data for the item in an application including the message;
outputting the display data in the application with the portion of the message; and
transmitting purchase information associated with the search result to another device for the online merchant associated with one of the message or the search result based on a selection of the display data on the device.

20. The non-transitory machine-readable medium of claim 19, wherein the operations further comprise:
receiving a transaction processing request for the item; and
processing an electronic transaction with the online merchant for the item using an account associated with the device.

* * * * *